Patented July 5, 1932

1,865,776

UNITED STATES PATENT OFFICE

CAMPBELL R. McCULLOUGH, OF ANNISTON, ALABAMA, ASSIGNOR TO SWANN RESEARCH, INC., A CORPORATION OF ALABAMA

PROCESS FOR THE PRODUCTION OF DIPHENYL MONOSULPHONIC ACID

No Drawing.   Application filed November 23, 1929.   Serial No. 409,430.

This invention relates to a process for the production of diphenyl monosulphonic acid, and more particularly to a process by which high yields of diphenyl monosulphonic acid may be obtained commercially, and has for its object the provision of a process by which diphenyl monosulphonic acid may be produced with good yields and without the production of objectionable amounts of diphenyl disulphonic acid. A further object of this invention is the production of a pure form of the diphenyl monosulphonic acid from diphenyl and sulphuric acid.

In the production of diphenyl monosulphonic acid, as heretofore known to me, difficulties have been encountered in obtaining satisfactory yields, due principally to the fact that considerable quantities of disulphonic acid are produced simultaneously with the monosulphonic acid. I have discovered that the entrance of the second sulphonic acid group into the diphenyl nucleus may be prevented by carefully adjusting the proportion of acid to diphenyl as well as the temperature of the reaction mixture.

In carrying out my invention, I may bring about a reaction between diphenyl and sulphuric acid to produce the monosulphonic acid while employing different proportions of diphenyl and sulphuric acid in the reaction vessel, and control the end product by controlling the temperature during the reaction and by employing sulphuric acid of the proper specific gravity. The proportions which may be employed vary from 1½ to 3 parts of 66° Bé. sulphuric acid to one part of diphenyl. As the proportion of sulphuric acid is increased, the temperature at which the reaction is carried out should be decreased in order to prevent the entrance of the second sulphonic group into the diphenyl nucleus. The temperature range varies from 110° to 115° C., when the proportions are one part diphenyl to 1½ parts of sulphuric acid, down to 50° to 70° C., when the proportions are 1 to 3 the range being taken from 110° to 50° C. for most purposes.

The following example illustrates the manner in which my invention may be carried out:

Heat 100 parts by weight of diphenyl to 85° C.; add 150 parts by weight of 66° Bé. sulphuric acid, while agitating vigorously over a period of 10 minutes. The heat of reaction raises the temperature and can be controlled by cooling means. During the first 10 minutes of the reaction the temperature is permitted to rise to between 110° C. to 115° C., and the reaction maintained at this temperature for 50 minutes. At the end of this time the reaction is tested for completeness by adding a sample of the mixture to 30–50 volumes of boiling water. A clear solution indicates absence of unreacted diphenyl, while a cloudy solution indicates the presence of unreacted diphenyl. Additional stirring at this temperature may be necessary to cause the remaining diphenyl to react.

With the method just given, it will be found that at the end of the sulphonation, the reaction mixture will contain substantially 32% of unreacted sulphuric acid. After a satisfactory test is obtained, the reaction mixture is diluted with 162 parts by weight of water, heated to boiling and then cooled slowly without stirring. By this means large crystals of diphenyl monosulphonic acid are obtained. When cool, the mass is filtered and the crystals washed with two portions of 33 parts by weight of cold water. After drying, the product is found to be substantially pure diphenyl monosulphonic acid. The yields are in the neighborhood of 80% to 86% of the theoretical amounts obtainable.

While the above example illustrates one way in which good yields of diphenyl monosulphonic acid may be obtained, the proportions of acid to diphenyl given above and the temperature may be somewhat departed from without seriously affecting the yield of the desired product. However, I have found that when greater proportions of sulphuric acid are used than that mentioned in the above example, the temperature should not be allowed to rise as high as 110° C. For example, if the proportions of acid to diphenyl are in the neighborhood of 3 parts of 66° Bé. acid to 1 part of diphenyl, then the temperature should not be allowed to rise above 70° C., being preferably kept between 50° and 70° C. until the test carried out as before described shows substantial absence of unreacted diphenyl.

What I claim is:

1. A process for the production of diphenyl monosulphonic acid which comprises mixing diphenyl with sulphuric acid in the proportions of approximately 1½ parts of 66° Bé. acid to one part of diphenyl and maintaining the temperature of the reaction mixture within a range of from 110° to 115° C.

2. A process for the production of diphenyl monosulphonic acid which comprises mixing diphenyl with sulphuric acid in the proportions ranging from 1½ to 3 parts of 66° Bé. acid to one part of diphenyl and maintaining the temperautre of the reaction mixture within a range of from 110° to 50°, the temperature of the reacting mass being maintained at progressively lower levels as the proportion of sulphuric acid is increased.

3. A process for the production of diphenyl monosulphonic acid which comprises mixing diphenyl with sulphuric acid in the proportions ranging from 1½ to 3 parts of 66° Bé. acid to one part of diphenyl and maintaining the temperature of the reaction mixture within a range of from 110° to 50° C., the temperature at which the reacting mass is held being reduced from the high temperature level in substantially inverse proportion to the increased proportion of sulphuric acid.

4. A process for the production of diphenyl monosulphonic acid, comprising mixing 100 parts of diphenyl with 150 parts by weight of 66° Bé. sulphuric acid, and maintaining the mixture at a temperature of between 100° C.–115° C., until substantially all the diphenyl has reacted, then diluting with water, cooling, and recovering the diphenyl monosulfonic acid by crystallization.

5. A process for the production of diphenyl monosulphonic acid, comprising mixing 100 parts of diphenyl with between 150 to 300 parts of 66° Bé. sulphuric acid, maintaining the mixture at a temperature from 100° C. to 50° C., until substantially all the diphenyl has reacted, the temperature level being lowered as the proportion of sulphuric acid is increased, then diluting with water, cooling, and removing the diphenyl monosulphonic acid by crystallization.

6. A process for the production of diphenyl monosulphonic acid comprising mixing 100 parts of diphenyl with sufficient 66° Bé. sulphuric acid so that after the reaction is complete an excess of approximately 32 percent of sulphuric acid remains unreacted, maintaining the mixture at a temperature in the neighborhood of 100° C., until substantialy all the diphenyl has reacted, then diluting with water, cooling, and recovering the diphenyl monosulphonic acid by crystallization.

7. A process for the production of diphenyl monosulphonic acid which comprises mixing diphenyl with sulphuric acid in the proportions of approximately 3 parts of 66° Bé. acid to one part of diphenyl and maintaining the temperature of the reaction mixture within a range of from 50° to 70° C.

In testimony whereof I affix my signature.
CAMPBELL R. McCULLOUGH.